United States Patent Office 3,437,491
Patented Apr. 8, 1969

3,437,491
TWO-STAGE SEQUENTIAL ION EXCHANGE
TREATMENT FOR WINE IMPROVEMENT
Richard G. Peterson and George R. Fujii, Modesto, Calif.,
assignors to E. & J. Gallo, Winery, Modesto, Calif., a
corporation of California
No Drawing. Filed Jan. 27, 1966, Ser. No. 523,274
Int. Cl. C12g 1/00; C12h 1/04
U.S. Cl. 99—35                                                 9 Claims

ABSTRACT OF THE DISCLOSURE

A sequential two-stage ion exchange procedure for treating wine, particularly fortified wine, to improve its flavor, aroma and color characteristics in which wine is treated first by a weak basic anion exchange resin and subsequently by an acidic cation exchange resin. A substantial reduction in the pH of the wine is produced without appreciable alteration in its titratable acidity. Effective ratios of the quantities of anion resin to cation resin used is 1:1½ through 4:1.

---

This invention relates generally to the production of wine. More particularly, this invention relates to an improved ion exchange treatment procedure for wine for the purpose of improving certain charactertistics of wine, such as its flavor, aroma and color.

Still more particularly, this invention relates to a sequential wine treating and stabilizing process in which wine is first subjected to the effects of an ion exchange material of the anion type, after which the wine is subjected to the effects of an ion exchange material of the cation type. The ion exchange treatment sequence employed is very important in that the improved characteristics sought are assured when the wine treatment is effected in the sequence stated. In conjunction with the particular two-stage sequential treatment mentioned, a further important feature of the process of this invention resides in utilization of an anion exchange material of a particular strength, as will be described.

This invention has particular utility when employed in the production of sweet or appetizer or dessert wines (that is, those wines identified as a group as fortified wines) which have a higher alcoholic content than unfortified table wines. Fortified wines include as an important step in their production the addition thereto of so called "grape spirits," usually in the form of brandy, which raises their alcoholic content into the range of 19–23%, of which approximately 20% is typical for most such wines. Because wines of this type are intended to contain unfermented sugar, alcoholic fortification is necessary to stabilize the wine to resist spoilage which otherwise could occur.

By way of example, wines well suited for treatment by the subject process include, but are not restricted to, sherries, ports, muscatels, tokays, and various flavored specialty wines produced under specific brand names by various wine producers. The subject process has been found highly effective in stabilizing fortified wines while at the same time improving the flavor, color and aroma characteristics of the final products.

Sequential ion exchange treatment of wines has been generally known in the art heretofore. However, prior known ion exchange procedures were specifically different from and sequentially reversed relative to the simplified and improved procedure of this invention. By way of brief summary, prior procedures employed a cation exchange step preceding an anion exchange step, which necessitated close quality control and close quantity relationships between the respective amounts of cation and anion materials employed, the relative strengths of such materials not being important.

By reversing the steps of the general procedures known heretofore, and by using an anion exchange material of weak strength compared to other available anion materials, a simplified and improved process has been developed with which highly effective wine treating results are assured.

The improved results obtained with the subject procedure produces a substantial change, in the direction of increasing acidity, of the pH of the base wine being treated, while the titratable acidity of the base wine is maintained constant or essentially unchanged. As used herein, titratable acidity (T.A.) is the value, expressed in grams tartaric acid per one hundred milliliters (mls.) of base wine, obtained by titrating base wine to a pH of 8.4 with a standard base, such as sodium hydroxide at a precise predetermined concentration, of which an 0.067 normal solution is representative.

Analytical procedures commonly used in wine processing identify the acid content of a given wine by a combination of its T.A. and pH. If the pH of wine is increased appreciably even temporarily, above a pH of 8.0 for example, an alkaline or soapy taste is imparted thereto. However, by lowering the pH of wine, without appreciably altering its T.A., a clearer, crisper, fresher taste is obtained. In this regard, some accompanying slight decrease or increase in T.A. will not adversely effect a wine's flavor. But a substantial decrease in T.A. will produce a very watery taste while a substantial increase in T.A. will produce a very sour taste. Therefore, a procedure, such as the subject invention, which is effective to appreciably lower pH without appreciably altering T.A. is highly desirable.

While, during intermediate stages of this procedure, some variation in the level of the pH and T.A. of the wine being treated occurs, the product obtained after the full sequential ion exchange treatment is completed has a much lower pH and a generally unchanged T.A. relative to the corresponding levels of the untreated wine. The treated wine also has the improved flavor, aroma and color characteristics sought for a commercial product.

With this invention, the natural acids of the base wine being treated are changed in conjunction with simultaneous and selective absorption of off-flavor, off-color, and off-aroma constituents by the ion exchange materials employed. It should be noted that a nautral base wine comprises a buffer system which generally includes 500 to 1500 parts per million (p.p.m.) potassium, traces of sodium, 1500 to 2000 p.p.m. tartaric acid, and up to 1000 p.p.m. malic acid. During the ion exchange treatment of this invention, undesirable metal cations, specifically potassium, are removed from the wine and replaced by hydrogen ions, while the organic acid anions, notably the tartrate ions of the tartaric acid, are removed from the wine and replaced by hydroxyl ions.

A cation exchange step in which metal cations are removed results in a lowering of a wine's pH and a raising of its T.A. An anion exchange step in which organic acid anions are removed results in a raising of a wine's pH and a lowering of its T.A. In a combination sequential ion exchange treatment of the type herein disclosed in which both anion and cation exchange steps are employed, the extent to which the pH and the T.A. are altered depends generally upon the relative numbers of anions and cations exchanged and the relative efficiencies of the ion exchange materials employed. The process of this invention is directed to a regulation of the relative efficiencies of the ion exchange materials chosen which permits substantial lowering of the pH of the base wine being treated without appreciably altering its T.A. In conjunction with lowering of pH, the undesirable constituents of the wine above noted are selectively absorbed simultaneously with lowering of the pH.

From the foregoing it should be understood that objects of this invention include the following: the provision of an improved ion exchange treating procedure for wines, notably fortified wines; the provision of an improved and simplified ion exchange treating process for wine which improves characteristics thereof by removing off-flavor, off-color and off-aroma constituents therefrom; the provision of a wine treating procedure by which the level of the pH of the wine is substantially lowered without appreciably altering the level of its T.A.; and the provision of a two stage ion exchange procedure in which the first step constitutes subjecting wine to the effects of a weak anion exchange material, followed by a second step which constitutes subjecting the wine to the effects of a cation exchange material which may be of various strengths. These and other objects of this invention will become apparent from a study of the following detailed description and accompanying examples presented herein.

The ion exchange procedure of this invention is employed on base wine obtained by the well known steps of crushing the grapes, removal of the stems to provide must, adding sulphur dioxide and yeast to the must, removing the pomace from the must by settling, and separating the free run juice which is then transferred to storage tanks for fermentation. Following fermentation the gelatinous lees are separated by settling, and the remaining fluid is filtered to obtain the fermented base wine which is then preferably fortified prior to being subjected to the stabilizing ion exchange procedure of this invention. Following the ion exchange procedure, the treated wine may be fined and have its analysis adjusted as required, prior to being bottled. Although fortification normally precedes the ion exchange treatment, under certain conditions fortification may follow the ion exchange without departing from this invention.

A danger inherent in an ion exchange procedure in which hydroxyl (OH—) ions are substituted for the tartrate ions of the organic acids of the wine is the possibility that the pH will be raised appreciably, to the alkaline level, thereby imparting an alkaline or soapy taste to the wine which can be removed satisfactorily only with extreme difficulty if at all. With this invention the danger mentioned is substantially obviated by using a weak basic anion exchange material before using any cation exchange material, irrespective of the relative strength of the latter. By employing the ion exchange materials having the relative strengths noted, and in the sequence described, the amounts of the respective ion exchange materials to which the base wine is subjected is not particularly critical so long as sufficient exchange materials are provided to effect maximum ion exchange. That is, with this procedure there is no appreciable danger of over exposing the base wine to the effects of the respective ion exchange materials so long as normal controls on the reaction are exercised.

Ion exchange materials found highly effective and extremely suitable for use with the subject process are readily available on the commercial market. In this regard and by way of example, effective anion and cation exchange materials, in the form of ion exchange resins, are produced and sold by the Chemical Process Company of Redwood City, Calif., now the Western Division of Diamond Alkali Company, under its identifying marks "Duolite A–7," "Duolite A–2," "Duolite C–25," and "Duolite C–20." The first two resins mentioned are classified as weak base anion exchangers having a high porosity phenolic matrix with amine active sites, while the latter two resins are classified as strong acid cation exchangers having a high porosity polystyrene matrix with neuclear sulphonic acid active sites. Of the illustrative resins mentioned, "Duolite A–7" and Duolite C–25" have been found particularly suitable for use in the subject procedure.

For further descriptive information concerning the illustrative ion exchange resins mentioned, reference is directed to: the "Duolite Ion Exchange Manual," copyrighted in 1960 by Chemical Process Company bearing Library of Congress Catalog Card No. 60–15806; Data Leaflet No. 2 entitled "Principal Duolite Ion Exchange and Absorbent Resins" dated September, 1956, published by Chemical Process Company; and Duolite Data Leaflet No. 2 entitled "Duolite Ion Exchange and Absorbent Resins" dated May, 1962 published by the Western Division of Diamond Alkali Company.

It should be understood of course that the resins specifically identified above are set out for purposes of illustration and that other suitable resins are available, including those of other producers, such as "Amberlite IR–120" which is a strong cation exchange resin comparable to the cation resins mentioned above, which is produced and sold by Rohm & Haas Company of Philadelphia, Pa.

While the illustrative cation resins above described are strong ion exchangers and such strong cation exchangers are generally preferred in this process, weak or intermediate strength cation exchangers also may be employed with this procedure. However, as noted previously, it is important that only weak anion exchangers, of which "Duolite A–7" is typical, are employed with this procedure. It should also be understood that the anion exchanger resin employed is in essentially the (OH—) form or state while the cation resin employed is in essentially the (H+) form or state.

In this latter regard, before subjecting the base wine to the sequential ion exchange procedure, the anion resin is regenerated in known fashion with a suitable basic regenerant of which sodium hydroxide (caustic), ammonium hydroxide or lime are typical, with sodium hydroxide being most commonly employed. Similarly, the cation exchange resin is regenerated in known fashion with a suitable mineral acid, of which sulphuric, hydrochloric or phosphoric are typical; alternatively a suitable organic acid of which citric, fumaric or malic are typical, may be employed. Of the illustrative regenerating acids listed, sulphuric and citric acid are perhaps most commonly employed.

Following regeneration of the respective ion exchange resins, they are washed in known fashion with pure water to remove any excess regenerant therefrom. Thereafter the regenerated resins may be treated by passing air or nitrogen thereover to remove excess water therefrom. Preferably also, because the resins employed are in the form or porous beads or granules, a conventional "sweentening-on" procedure of known type common in the industry is employed prior to the actual service run for the quantity of wine being treated to remove any entrapped water from inside the pores of the resins. Following the service run, a conventional "sweetening-off" procedure is employed before the respective resins are regenerated for another service run to remove any entrapped wine from the resins.

On a commercial scale, conventional large ion exchange columns of known types may be employed through which the base wine is introduced in sequence to first pass over a bed of anion resin and then over a bed of cation resin contained in the respective columns. Temporary intermediate storage of the wine being treated may or may not be employed between the anion and cation resin columns, depending upon production conditions and requirements. Either up-flow or down-flow for the base wine may be employed but down-flow is preferred so that the wine, which normally is introduced under some pump pressure into the columns, may flow downwardly under the additional effects of gravity over the resins contained in the respective columns. However, this process is not restricted to such a columnar treating procedure and the base wine being treated may be subjected to the ion exchange effects of the resins in manners other than by passing the same through an ion exchange column. For example, a true batch process may be employed in which predetermined amounts of resins may be added to the wine in vats and agitated with the resins therein.

When ion exchange columns are employed, however, even though the wine flows generally continuously through the respective columns (with or without intermediate storage between columns) the procedure is basically a batch procedure in that a given quantity of wine is passed sequentially through the columns in a two step procedure, followed by the preferred regeneration of the resins before another quantity of wine is contacted with the resins. By way of example, it has been found that an anion column approximately three feet in diameter and eight feet high, containing a bed of approximately thirty cubic feet of anion resin, and a similar size cation column, containing a bed of approximately twenty-four cubic feet of cation resin, are effective to treat between nine and fifteen thousand gallons of wine before resin regeneration is required. Testing of treated wine passed through the columns for proper acidity determines when regeneration should be effected.

As noted previously, it is important for effective operation that only weak anion exchange resins are used in the first stage of the procedure. Intermediate strength or strong anion resins raise the pH of the base wine too drastically. That is, intermediate or strong anion resins remove anions too efficiently and the pH-T.A. balance of the base wine is too drastically altered.

However, it has also been determined that a less efficient weak anion exchange resin produces the same undesirable effect if the wine has previously been treated with a cation resin in the (H+) form because then the wine is more susceptible to anion exchange, even by a weak anion resin. By placing a weak anion exchange step first in the procedure, the anion resin does not substitute hydroxyl (OH−) ions very efficiently for the tartrate ions of the base wine. Thus no alkaline or soapy taste is produced because the pH, while it increases somewhat during the intermediate stage (to approximately, for example, 4.5) does not increase appreciably and in no wise approaches the soapy taste pH level.

If a base wine is first treated with a cation exchange resin in essentially the (H+) form the comparative efficiency of a subsequent weak anion treatment increases to the extent that anion exchange is more readily effected and the pH can be raised drastically to produce the undesirable soapy taste. Heretofore attempts to avoid that undesirable result have been made by subjecting the wine to a much smaller quantity of anion exchange resin than cation exchange resin. This necessitated fairly close control of the relative quantities of wine to resin, and cation resin to anion resin. While stringent quantity controls can be effected, an inefficient anion exchange is undesirable because it has been found that the anion resin is the one which produces the most effective results in removing undesirable off-flavor, off-color and off-aroma constituents from the wine. The majority of those undesirable constituents are known to be anionic and the minority are known to be cationic, although the exact reasons for that condition is not known. Thus it is preferable to be able to use large quantities of anion resin in the treating procedure.

Any inefficiency in the subject procedure due to the use of a weak anion resin in the first step is far outweighed by the improved and highly effective off-constituent absorption which is effected by the greater quantity of the anion resin which can be employed, without requiring strict quantity control thereof and generally regardless of the rate of treatment thereby.

It should be understood that replacement of the metal cations in the wine with (H+) ions from the cation resin is accompanied by an increase in the T.A., and by a decrease in the pH. However, by previously replacing some of the wine tartrate anions with (OH−) ions, the wine tartrate anions remaining are not numerous enough to raise the T.A. appreciably. The net result then constitutes a substantial decrease in the pH of the wine without an appreciable increase in its T.A. This desirable and substantial modification of pH without appreciable modification of T.A. is further enhanced because the (H+) ions added to the wine combine with the (OH−) ions added thereto to produce water, which does not interfere with desired pH and T.A. levels.

It has also been found that an added advantage obtained by placing the weak anion exchange step first in the two stage procedure permits a much larger volume of wine to be treated with given amounts of resins without requiring regeneration than was possible with prior procedures.

The range of the pH level for base wines of the type here involved generally extends from 3.5 to 4.0 before treatment, particularly for ports and sherries. Similarly, the T.A. of such base wines before treatment generally ranges from 0.30 to 0.50. In line with the principal purpose of this invention, the T.A. of treated wine is to be maintained essentially unchanged while the pH is reduced appreciably. In this latter regard, preferably the pH is reduced at least 0.30 point or more, depending upon the type and initial pH of the base wine being treated. A decrease of pH within the range 0.3 to 1.0 may be obtained with this procedure. Preferably the pH is reduced to a preferred level of 3.0 to 3.3, with a post-exchange pH of approximately 3.2 being frequently obtained. As an indication of the effectiveness of a procedure capable of lowering pH to the extent herein disclosed, it has been determined that the hydrogen (H+) ion concentration of the base wine must be increased approximately 32% to lower pH 0.5 point.

A change of the level of T.A 0.04 in either direction from its original untreated level is considered no appreciable change within the framework of this invention. Usually the T.A. of a treated wine has varied only 0.01 or 0.02 from its untreated level.

While certain of the off-flavor, off-color, and off-aroma substances removed from the base wine with this procedure are identifiable and known, the nature of most such substances remain unidentified and unknown, although considerable work in the wine industry in attempting to define those substances is currently being undertaken. Concerning off-flavor and off-aroma substances, as a general rule they cannot be chemically or otherwise defined. As a result, acceptable flavor and aroma, and improvements therein, are still largely measured by the human senses of taste and smell by expert panels of wine tasters. In this regard, it is not definitely known which off-flavor substances have been removed by the subject procedure but it is apparent from expert taste tests that the treated wine is materially improved as a result of this treatment.

The same is generally true concerning the off-aroma substances, with one notable exception. It is known that undesirable hydrogen sulfide, which is very detrimental to acceptable wine aroma, is removed by this procedure. That substance imparts a very strong off-aroma, and accompanying off-flavor, if any of the sulfide remains. While hydrogen sulfide usually is present in wine in very small amounts, of about 1 p.p.m., all such substances is removed. In the absence of this procedure the most common procedures for hydrogen sulfide off-aroma removal is to permit normal oxidation by storage over extended periods.

Concerning the removal of off-color substances, somewhat more information is known about such substances and laboratory tests can be run to confirm removal of certain of such substances. That is, certain groups of off-color substances can be identified and segregated chemically, while other groups presently cannot. Of those which can be identified, the so called "Maillard Browning" compounds, which impart a brownish color to wine, are known to be removed from the base wine. These substances are known to comprise, for example, aldehyde-amine polymer compounds.

Following treatment by the ion exchange treatment of this invention, (accompanied by other known final treating steps as previously described) treated wines, and wines which have not been subjected to this procedure but which have been otherwise similarly processed to a finished product have been compared by tasting panels composed of expert wine tasters. In all instances the subject ion exchange treated wines were found to be significantly better in flavor appeal and aroma appeal than were the original untreated wines. In those wines where color is an important factor, the colors of the treated wines also were generally more pleasing. An important adjunct to the improvement of the flavor, aroma and color characteristics of the treated wines is the fact that no adverse effect is in any way imparted to the wines by the subject treatment. That is, the "basic character" of the wine, as understood in the governmental regulations controlling the wine industry, is in no way altered by the subject procedure.

While the following specific examples describe treatment of quantities of wine on a laboratory scale, it should be understood that treatment on a commercial scale may have been otherwise similarly processed to a finished be based on such laboratory tereatment by mathematically scaling up the quantities involved. In fact applicants' assignee's commercial operation is based on such laboratory examples. It should further be understood that these examples are intended to be illustrative rather than limiting of the invention.

EXAMPLE 1

One liter of port wine was passed in sequence and without intermediate storage through two beds of ion exchange resins contained in adjacent ion exchange columns. The first column contained 25 mls. of "Duolite A-7" weak basic anion resin which previously had been regenerated into the (OH—) form with sodium hydroxide, washed with pure water to remove excess regenerant, and treated with nitrogen to remove excess washwater. The second column contained 20 mls. of "Duolite C-25" strong acidic cation resin which previously had been regenerated into the (H+) form with sulfuric acid, washed with pure water to remove excess regenerant, and treated with nitrogen to remove excess washwater.

The respective analyses of the wine before and after the ion exchange treatment were as follows:

Before treatment:
    pH _____ 3.8
    T.A. _____ 0.39
After treatment:
    pH _____ 3.2
    T.A. _____ 0.40

The treated and untreated wines were compared by taste panels composed of expert wine tasters. The ion exchange treated wine was determined to be significantly better in flavor appeal and to have a more pleasing aroma and color than the untreated wine.

EXAMPLE 2

One liter of white port wine was passed in sequence through two columns containing anion and cation resins previously prepared as in Example 1. The first column contained 22 mls. of "Duolite A-7" resin and the second column contained 16 mls. of "Duolite C-25" cation resin. The respective analyses of the wine were as follows:

Before treatment:
    pH _____ 3.6
    T.A. _____ 0.35
After treatment:
    pH _____ 3.15
    T.A. _____ 0.37

The treated wine was determined by expert wine tasters to be significantly better in flavor appeal, and to have improved aroma and color characteristics in comparison to the untreated wine.

EXAMPLE 3

One and one half liters of muscatel wine was treated, as in Example 1, with 25 mls. of "Duolite A-7" anion resin and 21 mls. of "Amberlite IR-120" cation resin. The respective analyses were as follows:

Before treatment:
    pH _____ 4.0
    T.A. _____ 0.38
After treatment:
    pH _____ 3.2
    T.A. _____ 0.375

The expert panel of wine tasters determined the treated wine was thinner in body, cleaner in flavor and significantly more palatable than the untreated wine, and possessed improved arome and color characteristics.

EXAMPLE 4

One liter of port wine was treated, as in Example 1, with 29 mls. of "Duolite A-7" anion resin and 24 mls. of "Amberlite IR-120" cation resin. The respective analyses were as follows:

Before treatment:
    pH _____ 4.0
    T.A. _____ 0.50
After treatment:
    pH _____ 3.25
    T.A. _____ 0.475

The treated wine was found to be superior in taste, aroma and color.

EXAMPLE 5

One liter of tawny port wine was treated, as in Example 1, with 20 mls. of "Duolite A-7" and 16 mls. of "Duolite C-25," with the following results:

Before treatment:
    pH _____ 4.0
    T.A. _____ 0.37
After treatment:
    pH _____ 3.2
    T.A. _____ 0.38

The treated wine was found to be free of off-flavors and to be noticeably improved in flavor, aroma and color over the untreated wine.

The following examples are given for purposes of comparison with Example 5 to illustrate the improved characteristics obtained with the process of this invention.

EXAMPLE 6

One liter of the same tawny port wine employed in Example 5 was treated first with 20 mls. of strong basic anion resin regenerated in the (OH—) form, as in Example 1, followed by treatment with 16 mls. of strong acidic cation resin regenerated in the (H+) form, as in Example 1. The respective resins used were "Duolite A-101D" and "Duolite C-25," with the following results:

Before treatment:
    pH _____ 4.0
    T.A. _____ 0.37
After treatment:
    pH _____ 3.3
    T.A. _____ 0.25

While the pH of the treated wine was substantially reduced, the treated wine had a very disagreeable soapy taste and was unfit for further use.

EXAMPLE 7

One liter of the same tawny port employed in Example 5 was treated in reverse sequence, namely cation exchange first, followed by anion exchange as follows: the wine was first passed through 16 mls. of "Duolite C-25" cation resin and then through 20 mls. of "Duolite A-101D" anion resin, both regenerated as in Example 1. The comparative analyses were as follows:

Before treatment:
  pH ———————————————————————— 4.0
  T.A. ——————————————————————— 0.37
After treatment:
  pH ———————————————————————— 3.4
  T.A. ——————————————————————— 0.20

No soapy off-flavor was noticed in either treated or untreated wine. However, the expert wine tasters determined that the original untreated wine was better by a large margin.

Thereafter the treated wine was further treated by adding 2.0 gms. of pure tartaric acid thereto, which further lowered its pH to 3.2 and raised its T.A. to 0.40. The expert tasters then judged the further treated wine very drinkable and superior to the original untreated wine. However, in comparison to the wine treated as in Example 5, the further treated wine was judged less desirable than the wine treated with the process of this invention.

From the foregoing examples, coupled with the preceding disclosure, it should be understood that the ratio of anion resin to cation resin need not be regulated with strict precision. In this regard, it has been found that effective results are obtainable even if the anion to cation resin ratio varies within fairly broad but well defined limits, determined to a certain extent upon the type of wine being treated. It has been found that the ratio of anion to cation resins may vary within the following ranges—1:1½ through 4.1. In most instances, however, the desired results are obtainable if anion resin to cation resin is employed substantially in the ratio of approximately 5:4. To insure desired results, some preliminary testing of the wine discharged from the exchange columns, and some ratio adjustment based on such testing, may be employed.

Having thus made a full disclosure of the improved wine treatment procedure of this invention, reference is directed to the appended claims for the scope of protection to be afforded thereto.

We claim:
1. A sequential ion exchange procedure for treating wine, comprising:
  (A) first subjecting the wine being treated to the effects of a weak anion exchange material, and
  (B) thereafter subjecting the wine being treated to the effects of a cation exchange material.
2. The procedure of claim 1 in which:
  (C) said anion material to which said wine is subjected is an ion exchange resin in essentially the (OH—) form, and
  (D) said cation resin to which said wine is subjected is an ion exchange resin in essentially the (H+) form.
3. The procedure of claim 1 in which:
  (C) said anion material to which said wine is subjected is in the form of a weak base.
4. A sequential ion exchange process of treating wine to improve certain of its characteristics, such as its flavor, color and aroma, comprising
  (A) lowering substantially the pH of the wine being treated while maintaining the titratable acidity (T.A.) of said wine generally unchanged by
    (1) first contacting said wine with a weakly basic anion exchange resin in essentially the (OH—) form, which only slightly increases the pH of said wine above its untreated level and is accompanied by some decrease in the T.A. of said wine below its untreated level, followed by
    (2) contacting said wine with an acidic cation exchange resin in essentially the (H+) form, which appreciably decreases the pH of said wine to a level well below its original untreated level and is accompanied by a return of the T.A. of said wine to generally its original untreated level.
5. A sequential ion exchange treating process for reducing the pH of a base wine at least 0.3 point or more without appreciably altering the titratable acidity (T.A.) of the wine, comprising:
  (A) passing the wine being treated through a bed of weakly basic anion exchange resin in essentially the (OH—) form to thereby produce a substitution of (OH—) ions for tartrate ions in said wine.
    (1) such exchange being accompanied by some slight increase in the value of the pH of said wine but not an increase sufficient to adversely alter its flavor,
    (2) such exchange also normally being accompanied by some decrease in the T.A. of said wine, followed by
  (B) passing the wine being treated through a bed of acidic cation exchange resin in essentially the (H+) form to thereby produce a substitution of (H+) ions for metal ions, such as potassium ions, in said wine,
    (1) such exchange being accompanied by a substantial decrease in the value of the pH of said wine to a level at least 0.3 point or more below its original untreated level,
    (2) such exchange also being accompanied by an increase in the T.A. of said wine to a level generally equal to its original untreated level.
6. The process of claim 5 in which:
  (C) said anion exchange resin has been regenerated with an (OH—) ion donor material and said cation exchange resin has been regenerated with an (H+) ion donor material prior to passing said wine therethrough.
7. The process of claim 5 in which:
  (C) said wine being treated is passed directly from said bed of anion resin to and through said cation resin without intermediate storage in a generally continuous operation.
8. The process of claim 5 in which:
  (C) the ratio of the quantity of anion resin to the quantity of cation resin employed is in the range of 1:1½ through 4:1.
9. The process of claim 5 in which:
  (C) the ratio of the quantity of anion resin to the quantity of cation resin employed is approximately 5:4.

References Cited

UNITED STATES PATENTS 2,258,216  10/1941  Ramage ——————————— 99—48
2,682,468   6/1954  Frampton ————————— 99—48

A. LOUIS MONACELL, *Primary Examiner.*

D. M. NAFF, *Assistant Examiner.*

U.S. Cl. X.R.
99—31, 48